US012561335B2

(12) United States Patent
Dhoopar et al.

(10) Patent No.: US 12,561,335 B2
(45) Date of Patent: Feb. 24, 2026

(54) AUTOMATED EXPERT DETECTION

(71) Applicant: Glean Technologies, Inc., Palo Alto, CA (US)

(72) Inventors: Rohan Dhoopar, New York, NY (US); Lauren Zhu, San Francisco, CA (US); Michael Li, San Francisco, CA (US); Pancham Yadav, San Mateo, CA (US); Calvin Qi, San Francisco, CA (US); Vivek Choksi, Los Altos Hills, CA (US); Eddie Zhou, Redwood City, CA (US); Neil Rajesh Dhruva, San Francisco, CA (US); Piyush Prahladka, Los Altos, CA (US)

(73) Assignee: Glean Technologies, Inc., Palo Alto, CA (US)

( * ) Notice: Subject to any disclaimer, the term of this patent is extended or adjusted under 35 U.S.C. 154(b) by 0 days.

(21) Appl. No.: 18/771,893

(22) Filed: Jul. 12, 2024

(65) Prior Publication Data

US 2026/0017270 A1     Jan. 15, 2026

(51) Int. Cl.
*G06F 16/2457*     (2019.01)
*G06F 16/248*     (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 6,023,765 A | 2/2000 | Kuhn | |
| 6,236,994 B1 | 5/2001 | Swartz et al. | |
| 6,484,203 B1 | 11/2002 | Porras et al. | |
| 7,065,493 B1 | 6/2006 | Homsi | |
| 9,021,135 B2 | 4/2015 | Ang et al. | |
| 9,684,713 B2 * | 6/2017 | Bhandari | ............ G06F 16/3344 |

(Continued)

FOREIGN PATENT DOCUMENTS

| | | |
|---|---|---|
| WO | 2021084510 A1 | 5/2021 |
| WO | 2024173223 A1 | 8/2024 |

OTHER PUBLICATIONS

Impact of the Query Set on the Evaluation of Expert Finding Systems (Year: 2018).*

(Continued)

*Primary Examiner* — Kim T Nguyen

(57)     ABSTRACT

Methods and apparatuses for automatically identifying subject matter experts related to search results and displaying user identifications for the subject matter experts along with the search results are described. A search system may identify the subject matter experts based on the content of the search results, metadata associated with the search results, and various interactions including user-document interactions in which a user has created, edited, shared, or commented on a document. As the search system will only surface search results for which the user of the search system that submitted the search query has permission to access and the identification of the subject matter experts is determined based on the search results, the search system may prevent the inadvertent display of unauthorized information.

19 Claims, 8 Drawing Sheets

Data Sources 140
Collaboration and Communication Tools 141
File Storage and Synchronization Services 142
Issue Tracking Tools 143
Databases 144
Electronic Files 145

Search and Knowledge Management System 120
Knowledge Graph 124
Network Interface 125
Processor 126
Memory 127
Disk 128

Network(s) 180

Computing Device 154

Server 160
Network Interface 165
Processor 166
Memory 167
Disk 168

Networked Computing Environment 100

(56) References Cited

U.S. PATENT DOCUMENTS

| | | | |
|---|---|---|---|
| 10,169,546 B2 | | 1/2019 | Dettinger et al. |
| 10,289,645 B2 * | | 5/2019 | Brandstetter ....... G06F 16/9538 |
| 11,113,299 B2 * | | 9/2021 | Ghosh .............. G06F 16/24537 |
| 11,250,206 B2 | | 2/2022 | Jain et al. |
| 11,301,526 B2 * | | 4/2022 | Bostick ............ G06F 16/90335 |
| 11,562,143 B2 | | 1/2023 | Priestas et al. |
| 11,575,677 B2 | | 2/2023 | Jani et al. |
| 11,593,359 B1 * | | 2/2023 | Singhal ................. G06F 16/248 |
| 11,640,414 B2 | | 5/2023 | Liegard et al. |
| 11,681,968 B2 * | | 6/2023 | Dhaygude ........ G06Q 10/06393 |
| | | | 706/11 |
| 11,720,813 B2 | | 8/2023 | Babu et al. |
| 11,763,258 B2 | | 9/2023 | Fong et al. |
| 12,111,859 B2 | | 10/2024 | Siebel et al. |
| 12,321,862 B1 | | 6/2025 | Levin et al. |
| 2014/0337328 A1 * | | 11/2014 | Sarvabhotla ........... G06Q 10/10 |
| | | | 707/723 |
| 2016/0203140 A1 * | | 7/2016 | Paul ....................... G06Q 10/06 |
| | | | 707/723 |
| 2016/0267188 A1 * | | 9/2016 | Spaulding ......... G06F 16/24578 |
| 2019/0317937 A1 * | | 10/2019 | Ghosh ................... G06F 16/248 |
| 2019/0347302 A1 * | | 11/2019 | Walters ............... G06F 16/9024 |
| 2020/0065334 A1 | | 2/2020 | Rodriguez et al. |
| 2020/0193263 A1 | | 6/2020 | Pham |
| 2021/0110278 A1 | | 4/2021 | Meyerzon et al. |
| 2021/0216937 A1 * | | 7/2021 | Dhaygude ........ G06Q 10/06393 |
| 2021/0232991 A1 | | 7/2021 | Gupta |
| 2021/0264025 A1 | | 8/2021 | Givental et al. |
| 2021/0266323 A1 | | 8/2021 | Jani et al. |
| 2021/0279553 A1 | | 9/2021 | Zhu et al. |
| 2021/0382893 A1 * | | 12/2021 | Kumar ................... G06N 3/045 |
| 2022/0019740 A1 | | 1/2022 | Meyerzon et al. |
| 2022/0230112 A1 | | 7/2022 | Nayak et al. |
| 2023/0297923 A1 * | | 9/2023 | Dhaygude .............. G06N 5/022 |
| | | | 706/11 |
| 2023/0316190 A1 | | 10/2023 | Garrido et al. |
| 2024/0281472 A1 * | | 8/2024 | LaRhette ............ G06F 16/9558 |
| 2024/0281487 A1 * | | 8/2024 | Bathwal ............ G06F 16/24575 |
| 2024/0330589 A1 * | | 10/2024 | Kotaru .................. G06F 40/205 |
| 2025/0021919 A1 | | 1/2025 | Belkin et al. |
| 2025/0086467 A1 * | | 3/2025 | Yee ....................... G06N 3/0475 |
| 2025/0165890 A1 | | 5/2025 | Medford |
| 2025/0217418 A1 * | | 7/2025 | Bathwal ............ G06F 16/24575 |
| 2025/0272477 A1 * | | 8/2025 | Bhan ..................... G06F 40/166 |
| 2025/0371066 A1 * | | 12/2025 | Engi ..................... G06F 16/383 |

OTHER PUBLICATIONS

Evaluating large language models on a highly-specialized topic, radiation oncology physics (Year: 2023).*

Context Aware Query Rewriting for Text Rankers using LLM (Year: 2023).*

Barr, "Google just fired the first shot of the next battle in the AI war", Apr. 22, 2025, 4 pages, BusinessInsider.com (online), URL: https://www.businessinsider.com/google-openai-anthropic-ai-agents-training-data-2025-4&ved=2ahUKEwiEmO_hze6NAxWIJEQIHWApPEYQFnoECAsQAQ&usg=AOvVaw0BQjLPF1cJ46gtJLxugv2E.

OpenAI, "A practical guide to building agents", Apr. 2025, 34 pages, OpenAl.com (online), URL: https://www.google.com/url?sa=t&source=web&rct=j&opi=89978449&url=https://cdn.openai.com/business-guides-and-resources/a-practical-guide-to-building-agents.pdf&ved=2ahUKEwiKv47L3O6NAxXm48kDHfY0Ky0QFnoECAwQAQ&usg=AOvVawly3ZMDgXuA3eNSfxh9Ky8o.

Silver et al., "Welcome to the Era of Experience", Apr. 2025, 11 pages, google.com (online), URL: https://www.google.com/url?sa=t&source=web&rct=j&opi=89978449&url=https://t.co/Y6m4jLRjnh&ved=2ahUKEwixo8KO2u6NAxXJL0QIHURWLR0QFnoECBQQAQ&usg=AOvVaw3xhddmXx-BZRxj_7TUk_47.

Wiesinger et al., "AI Agents", Whitepaper, Sep. 2024, 42 pages, kaggle.com (online), URL: https://www.kaggle.com/whitepaper-agents?trk=public_post_comment-text.

* cited by examiner

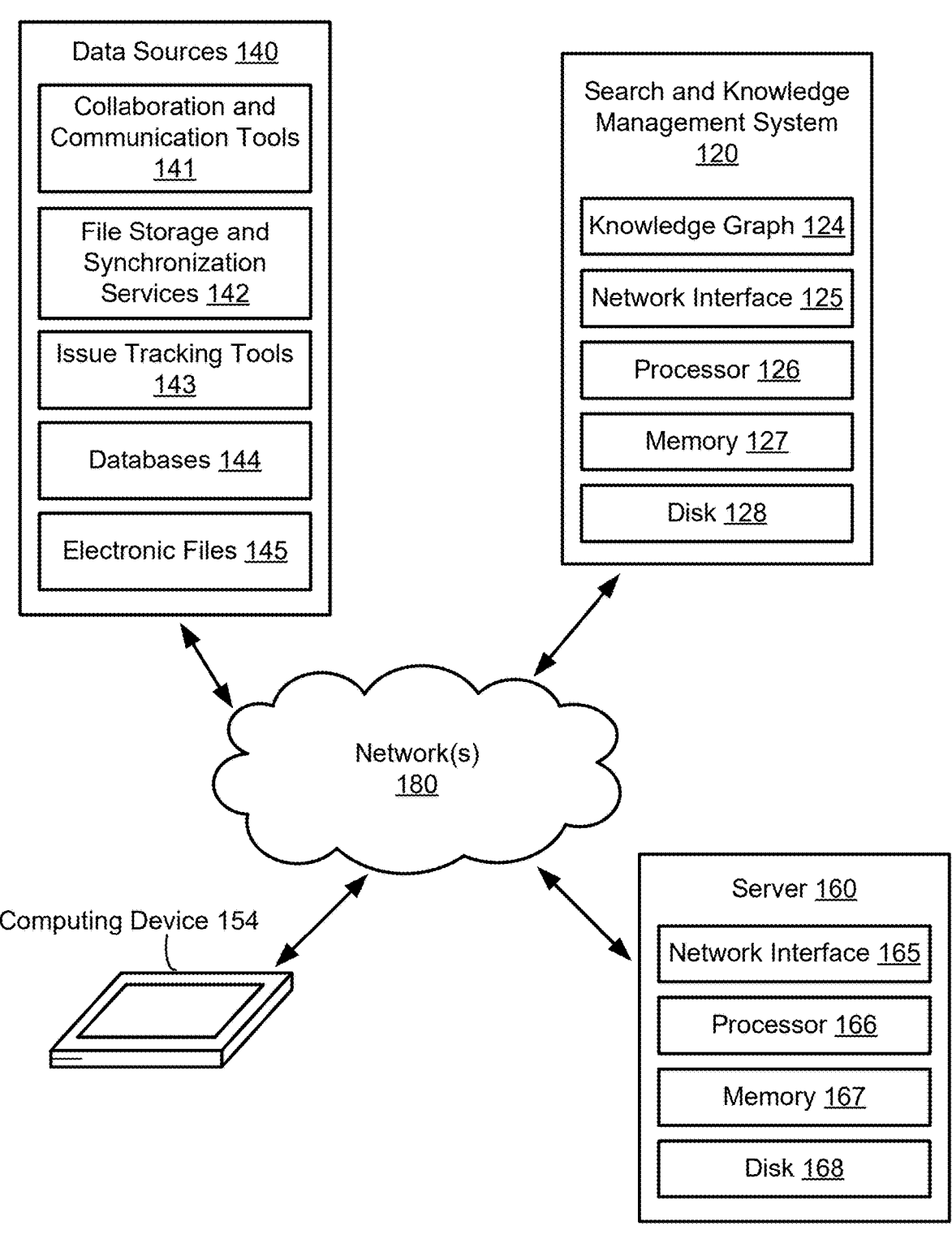

Data Sources 140

Collaboration and Communication Tools 141

File Storage and Synchronization Services 142

Issue Tracking Tools 143

Databases 144

Electronic Files 145

Search and Knowledge Management System 120

Knowledge Graph 124

Network Interface 125

Processor 126

Memory 127

Disk 128

Network(s) 180

Computing Device 154

Server 160

Network Interface 165

Processor 166

Memory 167

Disk 168

Networked Computing Environment 100

FIG. 1

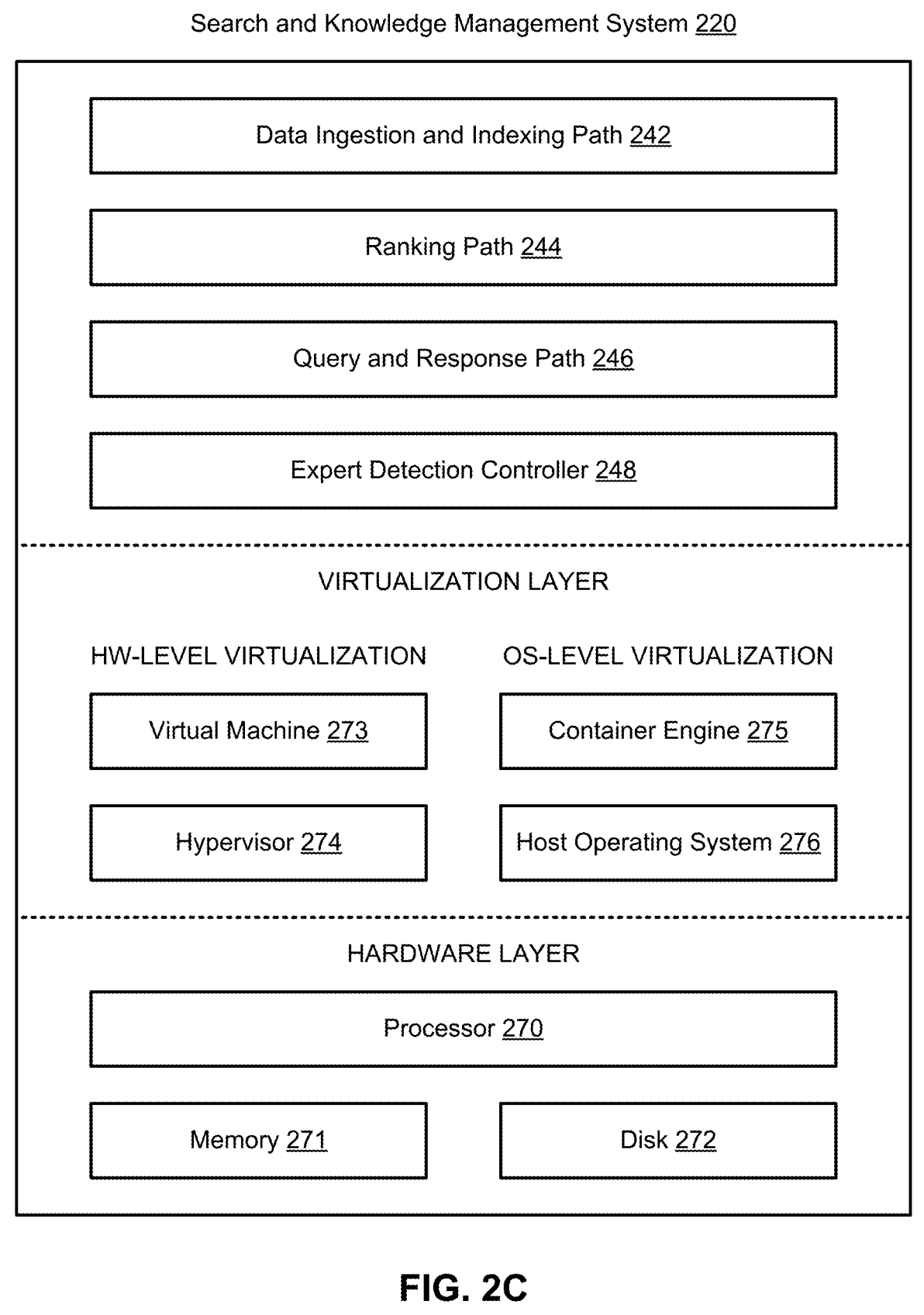

Search and Knowledge Management System 220

Data Ingestion and Indexing Path 242

Ranking Path 244

Query and Response Path 246

Expert Detection Controller 248

VIRTUALIZATION LAYER

HW-LEVEL VIRTUALIZATION

Virtual Machine 273

Hypervisor 274

OS-LEVEL VIRTUALIZATION

Container Engine 275

Host Operating System 276

HARDWARE LAYER

Processor 270

Memory 271

Disk 272

FIG. 2C

Mobile device 302

Mobile device 302

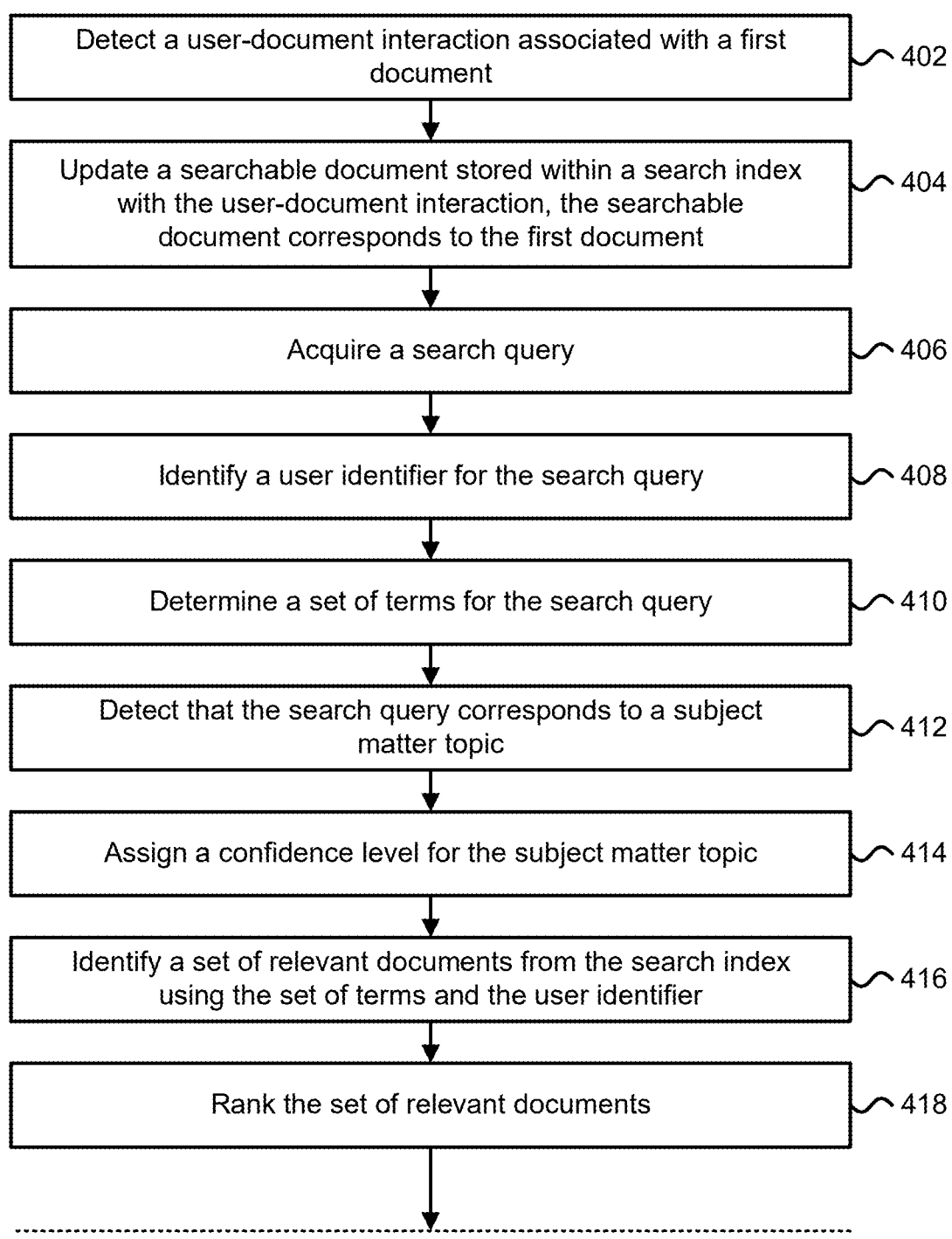

Detect a user-document interaction associated with a first document ⟋~402

Update a searchable document stored within a search index with the user-document interaction, the searchable document corresponds to the first document ⟋~404

Acquire a search query ⟋~406

Identify a user identifier for the search query ⟋~408

Determine a set of terms for the search query ⟋~410

Detect that the search query corresponds to a subject matter topic ⟋~412

Assign a confidence level for the subject matter topic ⟋~414

Identify a set of relevant documents from the search index using the set of terms and the user identifier ⟋~416

Rank the set of relevant documents ⟋~418

FIG. 4A

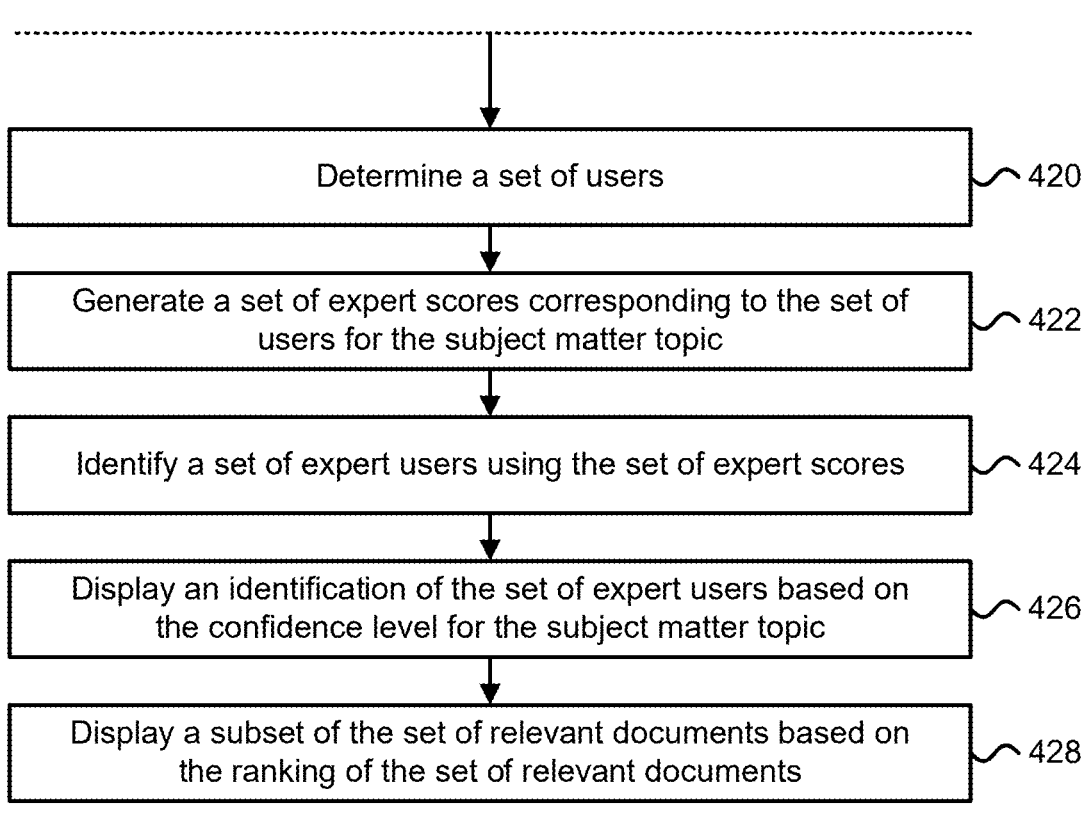

Determine a set of users ~420

Generate a set of expert scores corresponding to the set of users for the subject matter topic ~422

Identify a set of expert users using the set of expert scores ~424

Display an identification of the set of expert users based on the confidence level for the subject matter topic ~426

Display a subset of the set of relevant documents based on the ranking of the set of relevant documents ~428

FIG. 4B

AUTOMATED EXPERT DETECTION

BACKGROUND

Members of an organization may be granted restricted access to data (e.g., electronic documents) that is stored across various data repositories and data stores, such as enterprise databases and cloud-based data storage services. The data may comprise unstructured data or structured data (e.g., the data may be stored within a relational database). A search engine may allow the data to be indexed, searched, and displayed to authorized users that have permission to access or view the data. A user of the search engine may provide a textual search query to the search engine and in return the search engine may display the most relevant search results for the search query as links to electronic documents, web pages, electronic messages, images, videos, and other digital content. To determine the most relevant search results, the search engine may search for relevant information within a search index for the data and then score and rank the relevant information. In some cases, an electronic document indexed by the search engine may have an associated access control list (ACL) that includes access control entries that identify the access rights that the user has to the electronic document. The most relevant search results for the search query that are displayed to the user may comprise links to electronic documents and other digital content that the user is authorized to access in accordance with access control lists for the underlying electronic documents and other digital content.

BRIEF SUMMARY

Systems and methods are provided for automatically identifying subject matter experts related to search results and displaying user identifications for the subject matter experts along with the search results. A search system may generate a set of relevant search results for a search query submitted by a user of the search system. The search system may display links to documents corresponding to the set of relevant search results on a search results page along with user identifications for subject matter experts. The search system may identify the subject matter experts based on the content of the set of relevant search results, metadata associated with the set of relevant search results, and various interactions including user-document interactions. A user-document interaction may occur when a user of the search system has created, edited, shared, or commented on a document that is indexed by the search system. As the search system will only surface search results for which a user of the search system that submitted the search query has permission to access and the identification of the subject matter experts is determined based on the search results, the search system may prevent the inadvertent display of unauthorized information.

According to some embodiments, the technical benefits of the systems and methods disclosed herein include reduced energy consumption of computing resources performing subject matter expert detection, increased quality of search results, and improved data security.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements may refer to common components in the different figures.

FIG. 1 depicts one embodiment of a networked computing environment.

FIG. 2C depicts one embodiment of various components of the search and knowledge management system of FIG. 2A.

FIGS. 4A-4B depict a flowchart describing one embodiment of a process for performing automated expert detection.

DETAILED DESCRIPTION

Figure 2A:
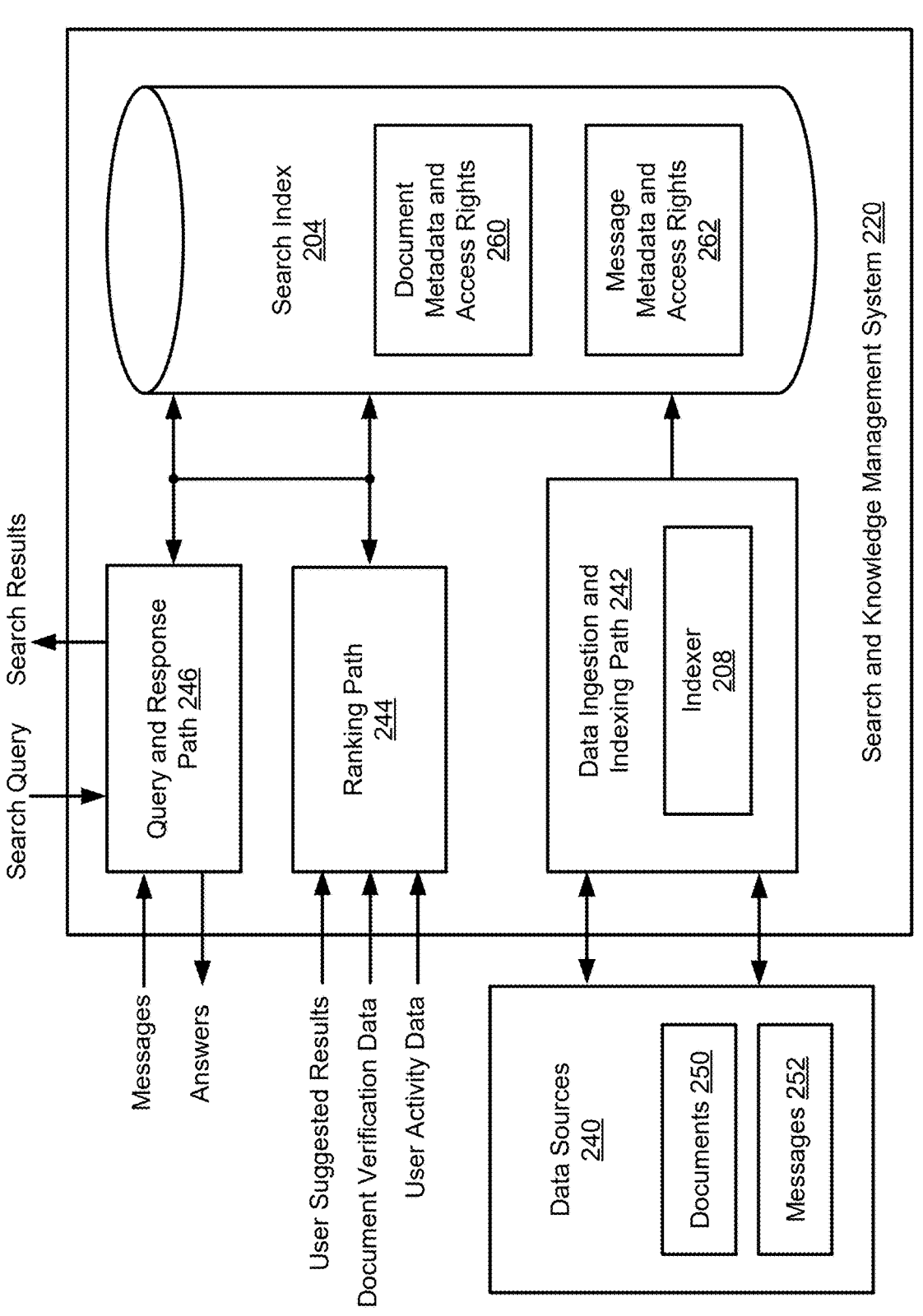
FIG. 2A depicts one embodiment of a search and knowledge management system in communication with one or more data sources.

Technology is described for performing automated expert detection in which a search system automatically identifies subject matter experts related to search results to be surfaced and displays user identifications for the subject matter experts along with the search results in response to the search system receiving a search query. The user identifications for the subject matter experts may comprise a listing of usernames for the subject matter experts for a subject matter topic corresponding with the search query. The search system may identify the subject matter experts based on the content of the search results, metadata associated with the search results, and various interactions including user-user interactions in which one user has interacted or collaborated with another user (e.g., via an exchange of electronic messages) and user-document interactions in which a user has created, edited, shared, or commented on a document. As the search system will only surface search results for which the user of the search system that entered the search query has permission to access and the identification of the subject matter experts is determined based on the search results to be surfaced, the search system may prevent the inadvertent display of unauthorized information. In one example, if a company's general counsel drafts a document regarding acquisition of the company that is only accessible to executives of the company, then the general counsel will not show up in the expert results if non-executive users enter search queries regarding the acquisition of the company.

The technical benefits of providing permissions-aware subject matter expert suggestions along with search results that are personalized to the user submitting a search query include improved data security. The technical benefits of automatically identifying and displaying subject matter experts based on search result content and metadata for which the user of the search system has permission to access or view include an improvement in data security, a reduction in data breaches, and an improvement in the ability for the search system to ensure that sensitive information is not lost, misused, or accessed by unauthorized users.

A permissions-aware search and knowledge management system may enable digital content (or content) stored across a variety of local and cloud-based data stores to be indexed, searched, and displayed to authorized users. The searchable content may comprise data or text embedded within electronic documents, hypertext documents, text documents, web pages, electronic messages, instant messages, database fields, digital images, and wikis. An enterprise or organization may restrict access to the digital content over time by dynamically restricting access to different sets of data to different groups of people using access control lists (ACLs) or authorization lists that specify which users or groups of users of the permissions-aware search and knowledge management system may access, view, or alter particular sets of data. A user of the permissions-aware search and knowledge management system may be identified via a unique username or a unique alphanumeric identifier. In some cases, an email address or a hash of the email address for the user may be used as the primary identifier for the user. To determine whether a user executing a search query has sufficient access rights to view particular search results, the permissions-aware search and knowledge management system may determine the access rights via ACLs for sets of data (e.g., for multiple electronic documents) underlying the particular search results at the time that the search is executed by the user or prior to the display of the particular search results to the user (e.g., the access rights may have been set when the sets of data underlying the particular search results were indexed).

To determine the most relevant search results for the user's search query, the permissions-aware search and knowledge management system may identify a number of relevant documents within a search index for the searchable content that satisfy the user's search query. The relevant documents (or items) may then be ranked by determining an ordering of the relevant documents from the most relevant document to the least relevant document. A document may comprise any piece of digital content that can be indexed, such as an electronic message or a hypertext document. A variety of different ranking signals or ranking factors may be used to rank the relevant documents for the user's search query. In some embodiments, the identification and ranking of the relevant documents for the user's search query may take into account user suggested results from the user and/or other users (e.g., from co-workers within the same group as the user or co-located at the same level within a management hierarchy), the amount of time that has elapsed since a user suggested result was established, whether the underlying content was verified by a content owner of the content as being up-to-date or approved content, the amount of time that has elapsed since the underlying content was verified by the content owner, and the recent activity of the user and/or related group members (e.g., a co-worker within the same group as the user recently discussed a particular subject related to the executed search query within a messaging application within the past week).

The permissions-aware search and knowledge management system may allow a user to search for content and resources across different workplace applications and data sources that are authorized to be viewed by the user. The permissions-aware search and knowledge management system may include a data ingestion and indexing path that periodically acquires content and identity information from different data sources and then adds them to a search index. The data sources may include databases, file systems, document management systems, cloud-based file synchronization and storage services, cloud-based applications, electronic messaging applications, and workplace collaboration applications. In some cases, data updates and new content may be pushed to the data ingestion and indexing path. In other cases, the data ingestion and indexing path may utilize a site crawler or periodically poll the data sources for new, updated, and deleted content. As the content from different data sources may contain different data formats and document types, incoming documents may be converted to plain text or to a normalized data format. The search index may include portions of text, text summaries, unique words, terms, and term frequency information per indexed document. In some cases, the text summaries may only be provided for documents that are frequently searched or accessed. A text summary may include the most relevant sentences, key words, personal names, and locations that are extracted from a document using natural language processing (NLP). The permissions-aware search and knowledge management system may utilize NLP and deep-learning models in order to identify semantic meaning within documents and search queries.

The permissions-aware search and knowledge management system may generate and display relevant answers to search queries (e.g., natural language search queries) explicitly submitted by the user or inferred from the viewing and editing behavior of the user within an electronic document or application. The search and knowledge management system may utilize machine learning models to understand content, context, and permissions from across an organization including working relationships between individuals within the organization, internal language, and security parameters. The working relationships between individuals within the organization, internal language that is unique to the organization, and organization specific security parameters may be determined using an organization specific knowledge graph that represents organization specific content, individuals, and activity within an organization, along with how each piece of information relates to one another. The nodes of the knowledge graph may correspond with contents (e.g., documents, messages, and tickets), individuals (e.g., usernames, identities and roles, team and group assignments), and activities (e.g., user viewing, editing, data sharing, and usage patterns). The edges of the knowledge graph may correspond with document-document interactions (or document linkages) in which one document references another document, user-user interactions in which one user has interacted or collaborated with another user (e.g., via an exchange of electronic messages), and user-document-interactions in which a user has created, edited, shared, or commented on a document.

FIG. 1 depicts one embodiment of a networked computing environment 100 in which the disclosed technology may be practiced. The networked computing environment 100 includes a search and knowledge management system 120, one or more data sources 140, server 160, and a computing device 154 in communication with each other via one or more networks 180. The networked computing environment 100 may include a plurality of computing devices interconnected through one or more networks 180. The networked computing environment 100 may correspond with or provide access to a cloud computing environment providing Software-as-a-Service (SaaS) or Infrastructure-as-a-Service (IaaS) services. The one or more networks 180 may allow computing devices and/or storage devices to connect to and communicate with other computing devices and/or other storage devices. In some cases, the networked computing environment 100 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. The one or more networks 180 may include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 100 may comprise real hardware computing devices or virtual computing devices, such as one or more virtual machines. The storage devices within the networked computing environment 100 may comprise real hardware storage devices or virtual storage devices, such as one or more virtual disks. The real hardware storage devices may include non-volatile and volatile storage devices.

The search and knowledge management system 120 may comprise a permissions-aware search and knowledge management system that utilizes user suggested results, document verification, and user activity tracking to generate or rank search results. The search and knowledge management system 120 may enable content stored in storage devices throughout the networked computing environment 100 to be indexed, searched, and displayed to authorized users. The search and knowledge management system 120 may index content stored on various computing and storage devices, such as data sources 140 and server 160, and allow a computing device, such as computing device 154, to input or submit a search query for the content and receive authorized search results with links or references to portions of the content. As the search query is being typed or entered into a search bar on the computing device, potential additional search terms may be displayed to help guide a user of the computing device to enter a more refined search query. This autocomplete assistance may display potential word completions and potential phrase completions within the search bar.

One type of user suggested result comprises a document pinning, in which a user or a document owner "pins" a user-specified search query to a document for a user-specified period of time. In one example, a user Sally may attach a user-specified search query, such as "my favorite cookie recipe," to a particular document for one month. In some cases, the permissions-aware search and knowledge management system may identify possessive pronouns and/or possessive adjectives within the user-specified search query (e.g., via a list of common possessive pronouns and adjectives) and replace the possessive pronouns and possessive adjectives with corresponding user identifiers (e.g., replacing "my" with "SallyB123-45-6789"). In another example, a document owner of a recipe document may pin the user-specified search query of "Sally's cookies from summer camp" to the recipe document for a three-month time period. In some cases, the permissions-aware search and knowledge management system may identify personal names within the user-specified search query and replace the personal names with corresponding user identifiers (e.g., replacing "Sally" with "SallyB123-45-6789"). The user-specified search query for the pinned document specified by the document owner may include terms that do not appear within the pinned document. Therefore, document pinning allows a user or document owner to add searchable context to the pinned document that cannot be derived from the document itself. For example, the user-specified search query for the pinned document may include a term that comprises neither a word match nor a synonym for any word within the pinned document. One technical benefit of allowing a user of the permissions-aware search and knowledge management system or a document owner to pin a user-specified search query to a document for a particular period of time (e.g., for the next three months) is that terms that are not found in the document or that cannot be derived from the contents of the document may be specified and subsequently searched in order to find the document, thereby improving the quality and relevance of search results.

As depicted in FIG. 1, the search and knowledge management system 120 includes a knowledge graph 124, network interface 125, processor 126, memory 127, and disk 128 all in communication with each other. The network interface 125, processor 126, memory 127, and disk 128 may comprise real components or virtualized components. In one example, the network interface 125, processor 126, memory 127, and disk 128 may be provided by a virtualized infrastructure or a cloud-based infrastructure. Network interface 125 allows the search and knowledge management system 120 to connect to one or more networks 180. Network interface 125 may include a wireless network interface and/or a wired network interface. Processor 126 allows the search and knowledge management system 120 to execute computer readable instructions stored in memory 127 in order to perform processes described herein. Processor 126 may include one or more processing units, such as one or more CPUs and/or one or more GPUs. Memory 127 may comprise one or more types of memory (e.g., RAM, SRAM, DRAM, EEPROM, Flash, etc.). Disk 128 may include a hard disk drive and/or a solid-state drive. Memory 127 and disk 128 may comprise hardware storage devices.

The knowledge graph 124 may be stored using a hardware storage device or within a data storage layer. The nodes of the knowledge graph may correspond with contents of electronic documents, user identifiers associated with different users, and user activities (e.g., user viewing, editing, data sharing, and usage patterns). The edges of the knowledge graph may correspond with document-document interactions in which one document references another document, user-user interactions in which one user has interacted or collaborated with another user, and user-document-interactions in which a user has created, edited, shared, or commented on a document.

In one embodiment, the search and knowledge management system 120 may include one or more hardware processors and/or one or more control circuits for performing a permissions-aware search in which a ranking of search results is outputted or displayed in response to a search query. The search results may be displayed using snippets or summaries of the content. In some embodiments, the search and knowledge management system 120 may be implemented using a cloud-based computing platform or cloud-based computing and data storage services.

The data sources 140 include collaboration and communication tools 141, file storage and synchronization services 142, issue tracking tools 143, databases 144, and electronic files 145. The data sources 140 may include a communication platform not depicted that provides online chat, threaded conversations, videoconferencing, file storage, and application integration. The data sources 140 may comprise software and/or hardware used by an organization to store its data. The data sources 140 may store content that is directly searchable, such as text within text files, word processing documents, presentation slides, and spreadsheets. For audio files or audiovisual content, the audio portion may be converted to searchable text using an audio to text converter or transcription application. For image files and videos, text within the images may be identified and extracted to provide searchable text. The collaboration and communication tools 141 may include applications and services for enabling communication between group members and managing group activities, such as electronic messaging applications, electronic calendars, and wikis or hypertext publications that may be collaboratively edited and managed by the group members. The electronic messaging applications may provide persistent chat channels that are organized by topics or groups. The collaboration and communication tools 141 may also include distributed version control and source code management tools. The file storage and synchronization services 142 may allow users to store files locally or in the cloud and synchronize or share the files across multiple devices and platforms. The issue tracking tools 143 may include applications for tracking and coordinating product issues, bugs, and feature requests. The databases 144 may include distributed databases, relational databases, and NoSQL databases. The electronic files 145 may comprise text files, audio files, image files, video files, database files, electronic message files, executable files, source code files, spreadsheet files, and electronic documents that allow text and images to be displayed consistently independent of application software or hardware.

The computing device 154 may comprise a mobile computing device, such as a tablet computer, that allows a user to access a graphical user interface for the search and knowledge management system 120. A search interface may be provided by the search and knowledge management system 120 to search content within the data sources 140. A search application identifier may be included with every search to preserve contextual information associated with each search. The contextual information may include the data sources and search rankings that were used for the search using the search interface.

A server, such as server 160, may allow a client device, such as the computing device 154, to download information or files (e.g., executable, text, application, audio, image, or video files) from the server or to enable a search query related to particular information stored on the server to be performed. The search results may be provided to the client device by a search engine or a search system, such as the search and knowledge management system 120. The server 160 may comprise a hardware server. In some cases, the server may act as an application server or a file server. In general, a server may refer to a hardware device that acts as the host in a client-server relationship or to a software process that shares a resource with or performs work for one or more clients. The server 160 includes a network interface 165, processor 166, memory 167, and disk 168 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity applications to computing devices, such as computing device 154. The networked computing environment 100 may provide access to protected resources (e.g., networks, servers, storage devices, files, and computing applications) based on access rights (e.g., read, write, create, delete, or execute rights) that are tailored to particular users of the computing environment (e.g., a particular employee or a group of users that are identified as belonging to a particular group or classification).

In some embodiments, the search and knowledge management system 120 may utilize processes that crawl the data sources 140 to identify and extract searchable content. The content crawlers may extract content on a periodic basis from files, websites, and databases and then cause portions of the content to be transferred to the search and knowledge management system 120. The frequency at which the content crawlers extract content may vary depending on the data source and the type of data being extracted. For example, a first update frequency (e.g., every hour) at which presentation slides or text files with infrequent updates are crawled may be less than a second update frequency (e.g., every minute) at which some websites or blogging services that publish frequent updates to content are crawled. In some cases, files, websites, and databases that are frequently searched or that frequently appear in search results may be crawled at the second update frequency (e.g., every two minutes) while other documents that have not appeared in search results within the past two days may be crawled at the first update frequency (e.g., once every two hours). The content extracted from the data sources 140 may be used to build a search index using portions of the content or summaries of the content. The search and knowledge management system 120 may extract metadata associated with various files and include the metadata within the search index. The search and knowledge management system 120 may also store user and group permissions within the search index. The user permissions for a document with an entry in the search index may be determined at the time of a search query or at the time that the document was indexed. A document may represent a single object that is an item in the search index, such as a file, folder, or a database record.

After the search index has been created and stored, then search queries may be accepted and ranked search results to the search queries may be generated and displayed. Only documents that are authorized to be accessed by a user may be returned and displayed. The user may be identified based on a username or email address associated with the user. The search and knowledge management system 120 may acquire one or more ACLs or determine access permissions for the documents underlying the ranked search results from the search index that includes the access permissions for the documents. The search and knowledge management system 120 may process a search query by passing over the search index and identifying content information that matches the search terms of the search query and synonyms for the search terms. The content associated with the matched search terms may then be ranked taking into account user suggested results from the user and others, whether the underlying content was verified by a content owner within a past threshold period of time (e.g., was verified within the past week), and recent messaging activity by the user and others within a common grouping. The authorized search results may be displayed with links to the underlying content or as part of personalized recommendations for the user (e.g., displaying an assigned task or a highly viewed document by others within the same group).

To generate the search index, a full crawl in which the entire content from a data source is fetched may be performed upon system initialization or whenever a new data source is added. In some cases, registered applications may push data updates; however, because the data updates may not be complete, additional full crawls may be performed on a periodic basis (e.g., every two weeks) to make sure that all data changes to content within the data sources are covered and included within the search index. In some cases, the rate of the full crawl refreshes may be adjusted based on the number of data update errors detected. A data update error may occur when documents associated with search results are out of date due to content updates or when documents associated with search results have had content changes that were not reflected in the search index at the time that the search was performed. Each data source may have a different full crawl refresh rate. In one example, full crawls on a database may be performed at a first crawl refresh rate and full crawls on files associated with a website may be also performed at a second crawl refresh rate greater than the first crawl refresh rate.

An incremental crawl may fetch only content that was modified, added, or deleted since a particular time (e.g., since the last full crawl or since the last incremental crawl was performed). In some cases, incremental crawls or the fetching of only a subset of the documents from a data source may be performed at a higher refresh rate (e.g., every hour) on the most searched documents or for documents that have been flagged as having a at least a threshold number of data update errors, or that have been newly added to the organization's corpus that are searchable. In other cases, incremental crawls may be performed at a higher refresh rate (e.g., content changes are fetched every ten minutes) on a first set of documents within a data source in which content deletion occurs at a first deletion rate (e.g., some content is deleted at least every hour) and performed at a lower refresh rate (e.g., content changes are fetched every hour) on a second set of documents within the data source in which content deletion occurs at a second deletion rate (e.g., content deletions occur on a weekly basis). One technical benefit of performing incremental crawls on a subset of documents within a data source that comprise frequently searched documents or documents that have a high rate of data deletions is that the load on the data source may be reduced and the number of application programming interface (API) calls to the data source may be reduced.

FIG. 2A depicts one embodiment of a search and knowledge management system 220 in communication with one or more data sources 240. In one embodiment, the search and knowledge management system 220 may comprise one implementation of the search and knowledge management system 120 in FIG. 1 and the data sources 240 may correspond with the data sources 140 in FIG. 1. The data sources 240 may include one or more electronic documents 250 and one or more electronic messages 252 that are stored over various networks, document and content management systems, file servers, database systems, desktop computers, portable electronic devices, mobile phones, cloud-based applications, and cloud-based services.

The search and knowledge management system 220 may comprise a cloud-based system that includes a data ingestion and index path 242, a ranking path 244, a query and response path 246, and a search index 204. The search index 204 may store a first set of index entries for the one or more electronic documents 250 including document metadata and access rights 260 and a second set of index entries for the one or more electronic messages 252 including message metadata and access rights 262. The data ingestion and index path 242 may crawl a corpus of documents within the data sources 240, index the documents and extract metadata for each document fetched from the data sources 240, and then store the metadata in the search index 204. An indexer 208 within the data ingestion and index path 242 may write the metadata to the search index 204. In one example, if a fetched document comprises a text file, then the metadata for the document may include information regarding the file size or number of words, an identification of the author or creator of the document, when the document was created and last modified, key words from the document, a summary of the document, and access rights for the document. The query and response path 246 may receive a search query from a user computing device, such as the computing device 154 in FIG. 1, and compare the search query and terms derived from the search query (e.g., synonyms and related terms) with the search index 204 to identify relevant documents for the search query. The query and response path 246 may also include or interface with an automated digital assistant that may interact with a user of the user computing device in a conversational manner in which answers are outputted in response to messages or questions provided to the automated digital assistant.

The relevant documents may be ranked using the ranking path 244 and then a set of search results responsive to the search query may be outputted to the user computing device corresponding with the ranking or ordering of the relevant documents. The ranking path 244 may take into consideration a variety of signals to score and rank the relevant documents. The ranking path 244 may determine the ranking of the relevant documents based on the number of times that a search query term appears within the content or metadata for a document, whether the search query term matches a key word for a document, and how recently a document was created or last modified. The ranking path 244 may also determine the ranking of the relevant documents based on user suggested results from an owner of a relevant document or the user executing the search query, the amount of time that has passed since the user suggested result was established, whether a document was verified by a content owner, the amount of time that has passed since the relevant document was verified by the content owner, and the amount and type of activity performed with a past period of time (e.g., within the past hour) by the user executing the search query and related group members.

Figure 2B:
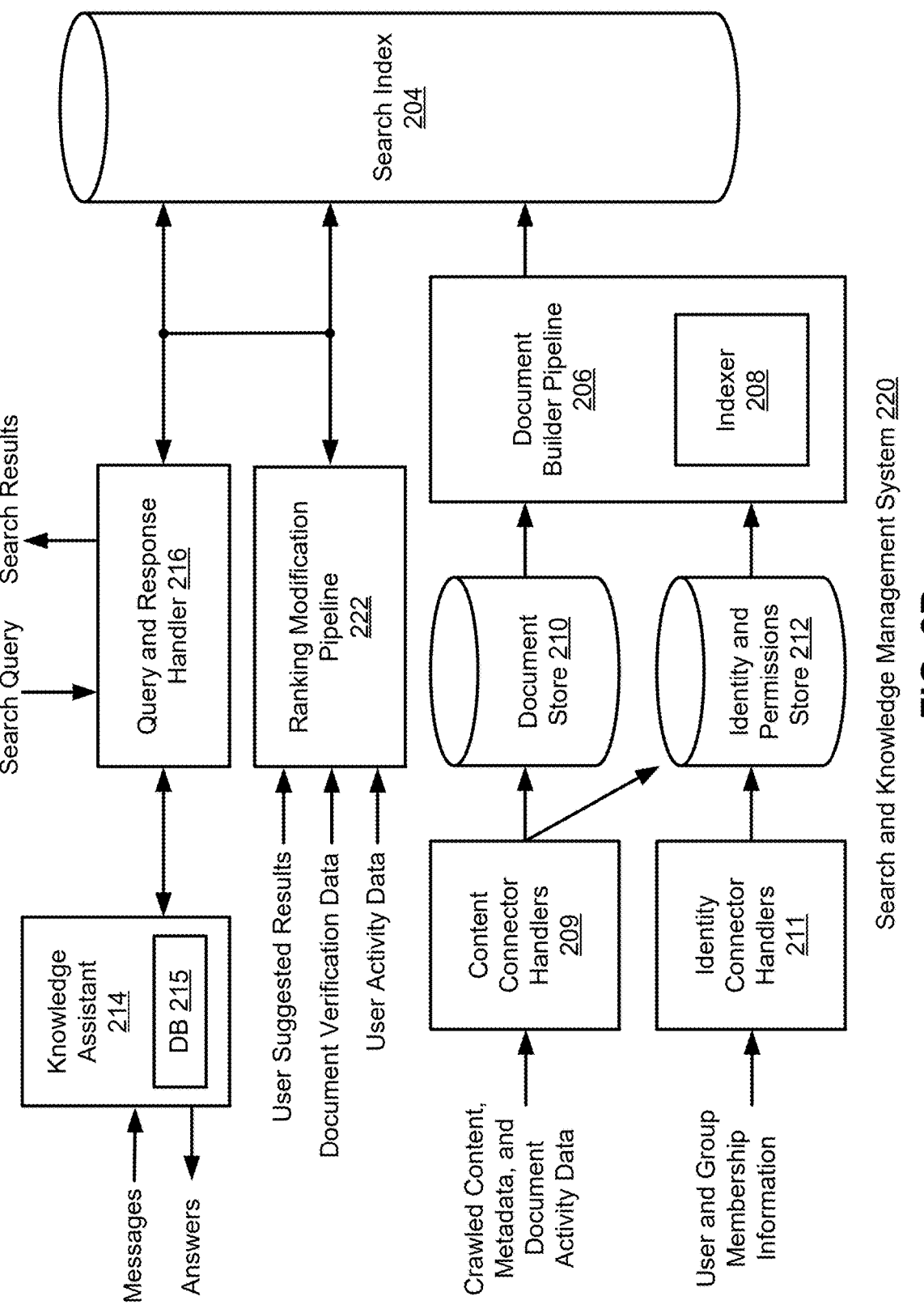
FIG. 2B depicts one embodiment of the search and knowledge management system of FIG. 2A.

FIG. 2B depicts one embodiment of the search and knowledge management system 220 of FIG. 2A. The search and knowledge management system 220 may comprise a cloud-based system that includes a data ingestion and indexing path, a ranking path, a query path, and a search index 204. The components of the search and knowledge management system 220 may be implemented using software, hardware, or a combination of hardware and software. In some cases, a cloud-based task service for asynchronous execution, cloud-based task handlers, or a cloud-based system for managing the execution, dispatch, and delivery of distributed tasks may be used to implement the fetching and processing of content from various data sources, such as data sources 240 in FIG. 2A. In some cases, a cloud-based task service or a cloud-based system for managing the execution, dispatch, and delivery of distributed tasks may be used to acquire and synchronize user and group identifications associated with content fetched from the various data sources. The data sources may have dedicated task queues or shared task queues depending on the size of the data source and the rate requirements for fetching the content. In one example, a data source may have a dedicated task queue if the data source stores more than a threshold number of documents or more than a threshold amount of content (e.g., stores more than 100 GB of data).

The data ingestion and indexing path is responsible for periodically acquiring content and identity information from the data sources 240 in FIG. 2A and adding the content and identity information or portions thereof to the search index 204. The data ingestion and indexing path includes content connector handlers 209 in communication with document store 210. The document store 210 may comprise a key value store database or a cloud-based database service. The content connector handlers 209 may comprise software programs or applications that are used to traverse and fetch content from one or more data sources. The content connector handlers 209 may make API calls to various data sources, such as the data sources 240 in FIG. 2A, to fetch content and data updates from the data sources. Each data source may be associated with one content connector for that data source. The content connector handlers 209 may acquire content, metadata, and activity data corresponding with the content. For example, the content connector handlers 209 may acquire the text of a word processing document, metadata for the word processing document, and activity data for the word processing document. The metadata for the word processing document may include an identification of the owner of the document, a timestamp associated with when the document was last modified, a file size for the document, and access permissions for the document. The activity data for the word processing document may include the number of views for the document within a threshold period of time (e.g., within the past week or since the last update to the document occurred), the number of likes for the document, the number of downloads for the document, and the number of shares associated with the document. The content connector handlers 209 may store the fetched content, metadata, and activity data in the document store 210 and publish the fetch event to a publish-subscribe (pubsub) system not depicted so that the document builder pipeline 206 may be notified that the fetch event has occurred. In response to the notification, the document builder pipeline 206 may process the fetched content and add the fetched content and information derived from the fetched content to the search index 204. The document builder pipeline 206 may transform or augment the fetched content prior to storing the information derived from the fetched content in the search index 204. In one example, the document builder pipeline 206 may augment the fetched content with identity information and synonyms.

Some data sources may utilize APIs that provide notification (e.g., via webhook pings) to the content connector handlers 209 that content within a data source has been modified, added, or deleted. For data sources that are not able to provide notification that content updates have occurred or that cannot push content changes to the content connector handlers 209, the content connector handlers 209 may perform periodic incremental crawls in order to identify and acquire content changes. In some cases, the content connector handlers 209 may perform periodic incremental crawls or full crawls even if a data source has provided webhook pings in the past in order to ensure the integrity of the acquired content and that the search and knowledge management system 220 is consistent with the actual state of the content stored in the data source. Some data sources may allow applications to register for callbacks or push notifications whenever content or identity information has been updated at the data source.

As depicted in FIG. 2B, the data ingestion and indexing path also includes identity connector handlers 211 in communication with identity and permissions store 212. The identity and permissions store 212 may comprise a key value store database or a cloud-based database service. The identity connector handlers 211 may acquire user and group membership information from one or more data sources and store the user and group membership information in the identity and permissions store 212 to enable search results that respect data source specific privacy settings for the content stored using the one or more data sources. The user information may include data source specific user information, such as a data source specific user identification or username. The identity connector handlers 211 may comprise software programs or applications that are used to acquire and synchronize user and/or group identities to a primary identity used by the search and knowledge management system 220 to uniquely identify a user. Each user of the search and knowledge management system 220 may be canonically represented via a unique primary identity, which may comprise a hash of an email address for the user. In some cases, the search and knowledge management system 220 may map an email address that is used as the primary identity for a user to an alphanumeric username used by a data source to identify the same user. In other cases, the search and knowledge management system 220 may map a unique alphanumeric username that is used as the primary identity for a user to two different usernames that are used by a data source to identify the same user, such as one username associated with regular access permissions and another username associated with administrative access permissions. If a data source does not identify a user by the user's primary identity within the search and knowledge management system 220, then an external identity that identifies the user for that data source may be determined by the search and knowledge management system 220 and mapped to the primary identity.

In some cases, the content connector handlers 209 may fetch access rights and permissions settings associated with the fetched content during the content crawl and store the access rights and permission settings using the identity and permissions store 212. For some data sources, the identity crawl to obtain user and group membership information may be performed before the content crawl to obtain content associated with the user and group membership information. When a document is fetched during the content crawl, the content connector handlers 209 may also fetch the ACL for the document. The ACL may specify the allowed users with the ability to view or access the document, the disallowed users that do not have access rights to view or access the document, allowed groups with the ability to view or access the document, and disallowed groups that do not have access rights to view or access the document. The ACL for the document may indicate access privileges for the document including which individuals or groups have read access to the document.

In some cases, a particular set of data may be associated with an ACL that determines which users within an organization may access the particular set of data. In one example, to ensure compliance with data security and retention regulations, the particular set of data may comprise sensitive or confidential information that is restricted to viewing by only a first group of users. In another example, the particular set of data may comprise source code and technical documentation for a particular product that is restricted to viewing by only a second group of users.

As depicted in FIG. 2B, the document store 210 may store crawled content from various data sources, along with any transformation or processing of the content that occurs prior to indexing the crawled content. Every piece of content acquired from the data sources may correspond with a row in the document store 210. For example, when the content connector handlers 209 fetch a spreadsheet or word processing document from a data source, the raw content for the spreadsheet or word processing document may be stored as a row in the document store 210. In addition to the raw content, a row in the document store 210 may also include interaction or activity data associated with the content, such as the number of views, the number of comments, the number of likes, and the number of users who interacted with the content along with their corresponding user identifications. A row in the document store 210 may also include document metadata for the stored content, such as keywords or classification information, and permissions or access rights information for the stored content.

The identity and permissions store 212 may store the primary identity for a user (e.g., a hash of an email address) within the search and knowledge management system 220 and corresponding usernames or data source identifiers used by each data source for the same user. A row in the identity and permissions store 212 may include a mapping from the user identifier used by a data source to the corresponding primary identity for the user for the search and knowledge management system 220. The identity and permissions store 212 may also store identifications for each user assigned to a particular group or associated with a particular group membership. The ACLs that are associated with a fetched document may include allowed user identifications and allowed group identifications. Each user of the search and knowledge management system 220 may correspond with a unique primary identity and each primary identity may be mapped to all groups that the user is a member of across all data sources.

As depicted in FIG. 2B, the data ingestion and indexing path includes document builder pipeline 206 in communication with search index 204. The document builder pipeline 206 may comprise software programs or applications that are used to transform or augment the crawled content to generate searchable documents that are then stored within the search index 204. The document builder pipeline 206 may include an indexer 208 that writes content derived from the fetched content, structured metadata for the fetched content, and access rights for the fetched content to the search index 204.

The searchable documents generated by the document builder pipeline 206 may comprise portions of the crawled content along with augmented data, such as access right information, document linking information, search term synonyms, and document activity information. In one example, the document builder pipeline 206 may transform the crawled content by extracting plain text from a word processing document, a hypertext markup language (HTML) document, or a portable document format (PDF)

document and then directing the indexer 208 to write the plain text for the document to the search index 204. A document parser may be used to extract the plain text for the document or to generate clean text for the document that can be indexed (e.g., with HTML tags or text formatting tags removed). The document builder pipeline 206 may also determine access rights for the document and write the identifications for the users and groups with access rights to the document to the search index 204. The document builder pipeline 206 may determine document linking information for the crawled document, such as a list of all the documents that reference the crawled document and their anchor descriptions, and store the document linking information in the search index 204. The document linking information may be used to determine document popularity (e.g., based on how many times a document is referenced or the number of outlinks from the document) and preserve searchable anchor text for target documents that are referenced. The words or terms used to describe an outgoing link in a source document may provide an important ranking signal for the linked target document if the words or terms accurately describe the target document. The document builder pipeline 206 may also determine document activity information for the crawled document, such as the number of document views, the number of comments or replies associated with the document, and the number of likes or shares associated with the document, and store the document activity information in the search index 204.

The document builder pipeline 206 may be subscribed to publish-subscribe events that get written by the content connector handlers 209 every time new documents or updates are added to the document store 210. Upon notification that the new documents or updates have been added to the document store 210, the document builder pipeline 206 may perform processes to transform or augment the new documents or portions thereof prior to generating the searchable documents to be stored within the search index 204.

As depicted in FIG. 2B, the query path includes a query and response handler 216 in communication with the search index 204 and the ranking modification pipeline 222. A knowledge assistant 214 interacts with the query and response handler 216 to provide a real-time automated digital assistant that may interact with a user of the search and knowledge management system 220 via a graphical user interface in a conversational manner using natural language dialog. The automated digital assistant may comprise a computer-implemented assistant that may access and display only information that a user's access rights permit. The knowledge assistant 214 may include a frequently asked questions (FAQ) database that includes question and answer pairs for questions identified within a chat channel that were classified as factual questions. The FAQ database may be stored in database DB 215 or in a solid-state memory not depicted.

The query and response handler 216 may comprise software programs or applications that detect that a search query has been submitted by an authenticated user identity, parse the search query, acquire query metadata for the search query, identify a primary identity for the authenticated user identity, acquire ranked search results that satisfy the search query using the primary identity and the parsed search query, and output (e.g., transfer or display) the ranked search results that satisfy the search query or that comprise the highest ranking of relevant information for the search query and the query metadata. The search query may be parsed by acquiring an inputted search query string for the search query and identifying root terms or tokenized terms within the search query string, such as unigrams and bigrams, with corresponding weights and synonyms. In some cases, natural language processing algorithms may be used to identify terms within a search query string for the search query. The search query may be received as a string of characters and the natural language processing algorithms may identify a set of terms (or a set of tokens) from the string of characters. Potential spelling errors for the identified terms may be detected and corrected terms may be added or substituted for the potentially misspelled terms.

The query metadata may include synonyms for terms identified within the search query and nearest neighbors with semantic similarity (e.g., with semantic similarity scores above a threshold that indicate their similarity to each other at the semantic level). The semantic similarity between two texts (e.g., each comprising one or more words) may refer to how similar the two texts are in meaning. A supervised machine learning approach may be used to determine the semantic similarity between the two texts in which training data for the supervised step may include sentence or phrase pairs and the associated labels that represent the semantic similarly between the sentence or phrase pairs. The query and response handler 216 may consume the search query as a search query string, and then construct and issue a set of queries related to the search query based on the terms identified within the search query string and the query metadata. In response to the set of queries being issued, the query and response handler 216 may acquire a set of relevant documents for the set of queries from the search index 204. The set of relevant documents may be provided to the ranking modification pipeline 222 to be scored and ranked for relevance to the search query. After the set of relevant documents have been ranked, a subset of the set of relevant documents may be identified (e.g., the top thirty ranked documents) based on the ranking and summary information or snippets may be acquired from the search index 204 for each document of the subset of the set of relevant documents. The query and response handler 216 may output the ranked subset of the set of relevant documents and their corresponding snippets to a computing device used by the authenticated user, such as the computing device 154 in FIG. 1.

Moreover, when a user issues a search query, the query and response handler 216 may determine the primary identity for the authenticated user and then query the identity and permissions store 212 to acquire all groups that the user is a member of across all data sources. The query and response handler 216 may then query the search index 204 with a filter that restricts the retrieved set of relevant documents such that the ACLs for the retrieved documents permit the user to access or view each of the retrieved set of relevant documents. In this case, each ACL should either specify that the user comprises an allowed user or that the user is a member of an allowed group.

The search index 204 may comprise a database that stores searchable content related to documents stored within the data sources 240 in FIG. 2A. The search index 204 may store text, title strings, chat message bodies, metadata, and access rights related to searchable content. For each searchable document, portions of text associated with the document, extracted key words, document classifications, and document summaries may be stored within the search index 204. For searchable electronic messages (e.g., searchable chat messages or email messages), the title, the message body of the original message, and the message bodies of related messages may be stored within the search index 204. For searchable question and answer responses, the message body of the question and the message body of the answer may be stored within the search index 204. A question and answer pair may derive from questions and answers made by the user or made by other users (e.g., co-workers) during a conversation exchange within a persistent chat channel or from dialog between an artificial intelligence powered digital assistant and the user within a chat channel. One example of an artificial intelligence powered digital assistant is the knowledge assistant 214 that may automatically output answers to messages or questions provided to the digital assistant. Text associated with other documents linked to or referenced by a searchable document, electronic message, or question and answer pair may also be stored within the search index 204 to provide context for the searchable content. Content access rights including which users and groups are allowed to access the content may be stored within the search index 204 for each piece of searchable content.

As depicted in FIG. 2B, the ranking modification pipeline 222 may comprise software programs or applications that are used to score and rank documents and portions of documents. The scoring of a set of relevant documents may weight different attributes of the documents differently. In one example, literal matches or lexical matches of search query terms within the body of a message or document may correspond with a first weighting while semantic matches of the search query terms may correspond with a second weighting different from the first weighting (e.g., greater than the first weighting). The matching of search query terms or their synonyms within a message body may be given a first weighting while the matching of the search query terms within a title field or within the text of a referencing document (e.g., anchor text within a source document) may be given a second weighting different from the first weighting (e.g., greater than the first weighting). The scoring and ranking of a set of relevant documents may take into consideration document popularity, which may change over time as a document ages or as the number of views for a document within a past period of time (e.g., within the past week) increases or decreases. A higher document popularity score may increase the ranking of a document, while a lower document popularity score may signal that the document has become stale and that its importance should be demoted. The ranking modification pipeline 222 may score and rank a set of relevant documents based on user suggested results submitted by owners of the relevant documents, the document verification statuses of the relevant documents, and the amount and type of user activity performed within a past period of time (e.g., within the past 24 hours) by the user executing a search query and others that are part of a common grouping with the user (e.g., co-workers on the same team or assigned to the same group).

FIG. 2C depicts one embodiment of various components of the search and knowledge management system 220 of FIG. 2A. As depicted, the search and knowledge management system 220 includes hardware-level components and software-level components. The hardware-level components may include one or more processors 270, one or more memory 271, and one or more disks 272. The one or more memory 271 and the one or more disks 272 may comprise storage devices or hardware storage devices. The software-level components may include software applications and computer programs. In some embodiments, the data ingestion and index path 242, the ranking path 244, the query and response path 246, and the expert detection controller 248 may be implemented using software or a combination of hardware and software. In some cases, the software-level components may be run using a dedicated hardware server. In other cases, the software-level components may be run using a virtual machine or containerized environment running on a plurality of machines. In various embodiments, the software-level components may be run from the cloud (e.g., the software-level components may be deployed using a cloud-based compute and storage infrastructure).

As depicted in FIG. 2C, the software-level components may also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as applications for the data ingestion and index path 242, the ranking path 244, and the query and response path 246. The virtual machine 273 may run the host operation system 276 upon which the container engine 275 may run.

A container engine 275 may run on top of the host operating system 276 in order to run multiple isolated instances (or containers) on the same operating system kernel of the host operating system 276. Containers may facilitate virtualization at the operating system level and may provide a virtualized environment for running applications and their dependencies. Containerized applications may comprise applications that run within an isolated runtime environment (or container). The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

The expert detection controller 248 may automatically identify subject matter experts related to search results and cause user identifications for the subject matter experts to be displayed along with the search results. The expert detection controller 248 may identify the subject matter experts based on the content of the search results, metadata associated with the search results, and various interactions including user-document interactions.

The expert detection controller 248 may utilize one or more large language models to identify subject matter experts and provide a brief natural language explanation of why they are subject matter experts. A large language model (LLM) refers to a language model that comprises a neural network with a large number of parameters (e.g., millions or billions of parameters or weights). In order to reduce training time and cost, transfer learning can be utilized in which a pre-trained model is used as a starting point for a specific task and then trained or fine-tuned with a supervised dataset for the specific task. In one example, an LLM is pre-trained using a large dataset and then fine-tuned using a much smaller dataset to tailor the LLM to solve a specific task. Pretraining refers to the act of training a machine learning model from scratch without any prior knowledge using a large corpus of data. Fine-tuning refers to a transfer learning process that modifies a pretrained LLM by training the LLM in a supervised or semi-supervised manner. In some cases, the fine-tuning involves adapting a pretrained LLM for a specific task by fine-tuning the LLM using a task specific dataset.

In some cases, an LLM comprises a transformer model that is implemented using a transformer-based neural network architecture. A transformer model includes an encoder and/or a decoder. An encoder extracts features from an input sequence and a decoder uses the extracted features from the encoder to produce an output sequence. In some cases, an encoder comprises one or more encoding layers and a decoder comprises one or more decoding layers. Each encoding and decoding layer includes a self-attention mechanism that relates tokens within a sequence of tokens to other tokens within the sequence. In one example, the self-attention mechanism allows the transformer model to examine a word within a sentence and determine the relative importance of other words within the same sentence to the examined word. In some cases, an encoder includes a self-attention layer and a feed forward neural network layer and a decoder includes two self-attention layers and a feed forward neural network layer. In some cases, a transformer model (or transformer) utilizes an encoder-decoder architecture, an encoder only architecture, or a decoder only architecture.

One example of a transformer model is a Generative Pre-trained Transformer (GPT) model. A GPT model comprises a type of LLM that uses deep learning to generate human-like text. A GPT model is referred to as being "generative" because it generates new content based on a given input prompt (e.g., a text prompt), "pre-trained" because it is trained on a large corpus of data before being fine-tuned for specific tasks, and a "transformer" because it utilizes a transformer-based neural network architecture to process the input prompt to generate the output content (or response).

In some cases, Retrieval Augmented Generation (RAG) may be used to improve the search quality and accuracy of LLMs for search-related tasks (e.g., question answering tasks) by first retrieving relevant documents from a search index based on an input search query prior to using an LLM to generate an output or answer. Moreover, the LLM for generating the output or answer will only be able to access content within the relevant documents that is accessible by a user providing the input search query. Specifically, only experts visible to the user, inferred from relevant documents accessible to the user, will be fed to the LLM to generate answers, thereby improving data security.

Multimodal learning refers to a type of machine learning in which a machine learning model is trained to understand multiple forms of input data (e.g., text, images, video, and audio data) that derive from different modalities. Image data can include different types of images, such as color images, depth images, and thermal images. In some cases, a machine learning model comprises a multimodal model, a language model, or a visual model.

Figure 3A:
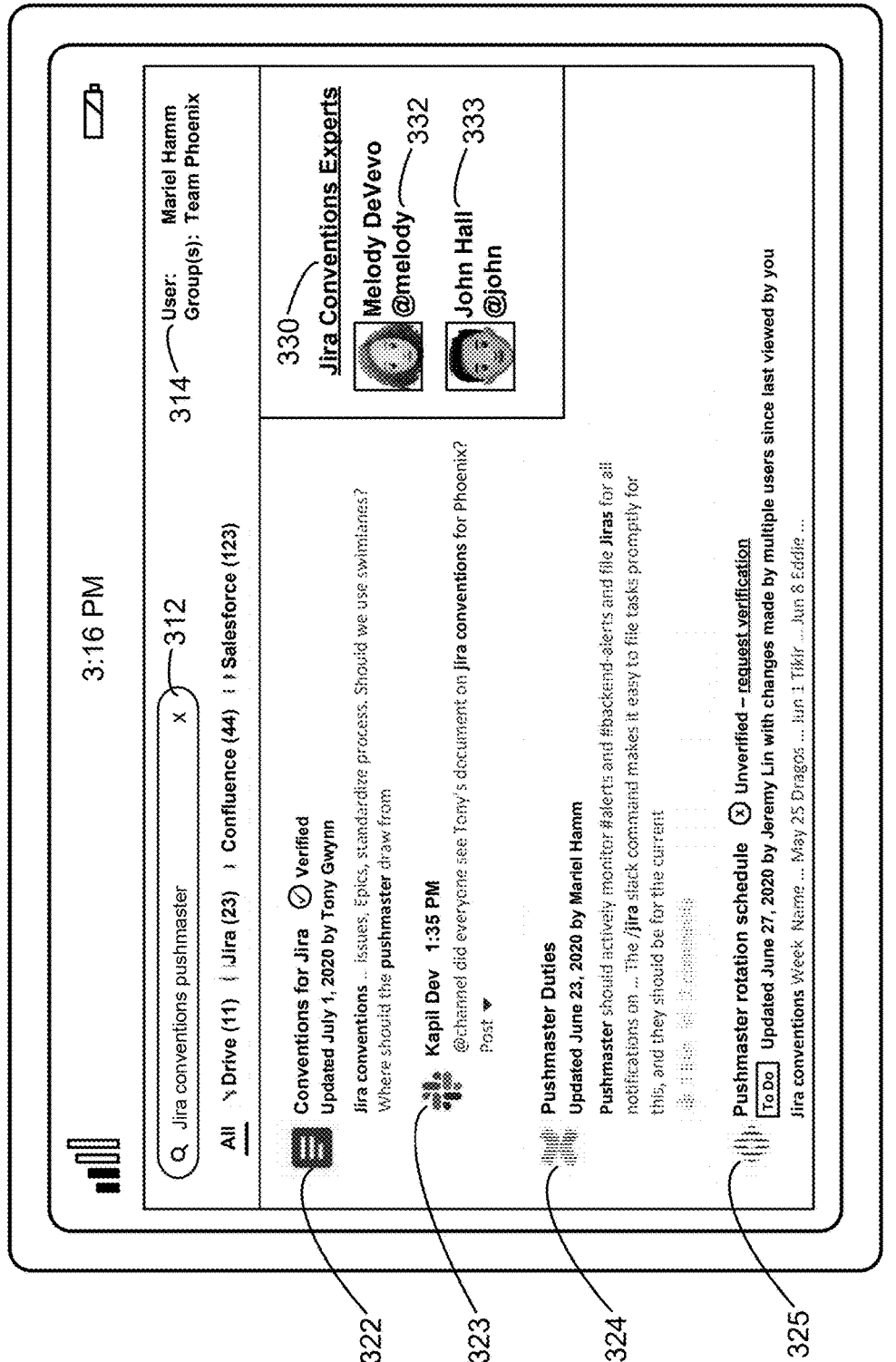
FIG. 3A depicts one embodiment of a mobile device providing a user interface for interacting with a permissions-aware search and knowledge management system.

FIG. 3A depicts one embodiment of a mobile device 302 providing a user interface for interacting with a permissions-aware search and knowledge management system, such as the search and knowledge management system 220 in FIG. 2A. As depicted, the user corresponding with the username 314 has entered a search query with the search terms "Jira conventions pushmaster" into a search bar 312. In response to the entered search query, the permissions-aware search and knowledge management system has generated and displayed four search results 322-325 that comprise the four most relevant and highest ranked search results for the search query. Each search result may include a link to an underlying document, message, or web page and a snippet or summary of the relevant information found within the search result.

In addition to the displayed search results that include search results 322-325, the permissions-aware search and knowledge management system has generated and displayed user identifications for subject matter experts 332-333 based on the search results and the search query. The permissions-aware search and knowledge management system has identified and displayed a subject matter topic 330 corresponding to the search query. The user identifications for the subject matter experts 332-333 may includes usernames, individual identification numbers (e.g., an employee number), and contact information for the subject matter experts. The contact information may include, for example, an email address for the subject matter expert and/or a cell number of the subject matter expert.

In one embodiment, an expert detection controller, such as the expert detection controller 248 in FIG. 2C, may determine a set of search results for the search query that was entered into the search bar 312 based on access rights corresponding to the username 314. In one example, the set of search results may comprise the top 50 highest ranking search results for the search query given the username 314. The subject matter experts 332-333 identified by the expert detection controller may comprise the top two highest ranking subject matter experts generated based on content (e.g., textual content) from the set of search results and metadata from documents referenced by the set of search results (e.g., usernames associated with document creators and the most recent document editors). In some cases, identifications of subject matter experts derived from the set of search results may be ranked based on the number of times that a particular username is associated with document creation for documents within the top 50 highest and/or the number of times that a particular username is associated with document edits for documents within the top 50 highest.

In one embodiment, the expert detection controller may utilize one or more LLMs to identify the top two subject matter experts taking as input content from the set of search results, metadata associated with documents from the set of search results, and various electronic interactions including user-user interactions in which one user has interacted or collaborated with another user (e.g., via an exchange of electronic messages) and user-document interactions in which a user has created, edited, shared, or commented on a document. The one or more LLMs may be trained using labeled training data in which sets of electronic documents (e.g., corresponding to sets of search results for various search queries) are labeled with predetermined expert identifiers for each set of the sets of electronic documents. In one example, a first set of electronic documents associated with "Jira conventions" may map to an expert identifier for employee "John Hall" and a second set of electronic documents associated with "Pushmaster experts" may map to an expert identifier for employee "Melody DeVevo." The sets of electronic documents may comprise 1000 different sets of documents and the corresponding expert identifiers.

Figure 3B:
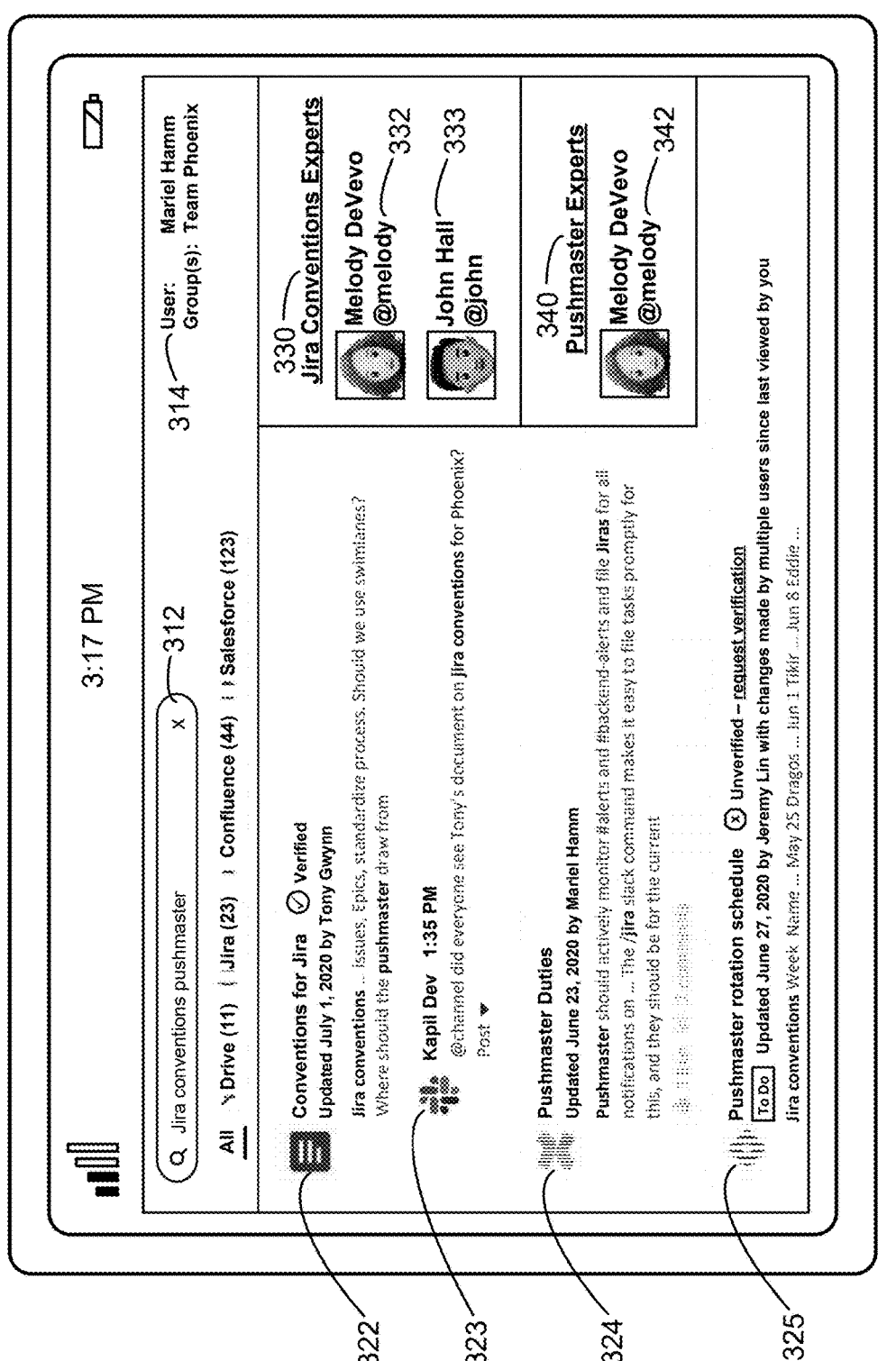
FIG. 3B depicts one embodiment of the mobile device 302 of FIG. 3A providing a user interface that displays two different sets of subject matter experts for the same search query.

FIG. 3B depicts one embodiment of the mobile device 302 of FIG. 3A providing a user interface that displays two different sets of subject matter experts for the same search query that was entered into the search bar 312. As depicted, two different subject matter topics 330 and 340 have been identified based on the search query. A subject matter expert 342 has been identified and displayed for the subject matter topic 340.

FIGS. 4A-4B depict a flowchart describing one embodiment of a process for performing automated expert detection. In one embodiment, the process of FIGS. 4A-4B may be performed by a search and knowledge management system, such as the search and knowledge management system 120 in FIG. 1 or the search and knowledge management system 220 in FIG. 2A. In another embodiment, the process of FIGS. 4A-4B may be implemented using a cloud-based computing platform or cloud-based computing services.

In step 402, a user-document interaction associated with a first document is detected. As examples, the first document may comprise a word processing document, a hypertext markup language (HTML) document, a webpage, a spreadsheet, a database file, a ticket, an electronic message, or an electronic document that has been indexed by a search system. The detection of the user-document interaction may comprise detection that a user has created, edited, shared, or commented on the first document. Over time, user-document interactions by document owners or users who have authored, commented, edited, or verified documents may be detected and stored within a search index of the search system. In some cases, a user-document interaction for the first document may be stored in a database or as metadata associated with the first document.

In one example, the first document may comprise a project specification and five users may edit the first document with each of the five users working on different sections that they are the subject matter experts in. A searchable document corresponding to the first document that is stored in the search index may be updated to reflect the edits made by the five users. In some embodiments, the searchable document corresponding to the first document that is stored in the search index may partition the first document into five different sections and assign a different user of the five users to each partition. In one example, the first document may comprise a project specification with five different sections and each of the five users may update or draft one of the five sections. If the first document is returned as a search result, then the most relevant section of the five sections for a search query and the corresponding user who updated or drafted the most relevant section may be returned and displayed.

In step 404, a searchable document stored within a search index is updated with the user-document interaction. The searchable document may correspond to the first document. User-document interactions may be stored along with each document stored within the search index. The searchable document corresponding to the first document may store a user identifier for each user-document interaction with the first document within a past threshold period of time (e.g., every user-document interaction with the first document over the past six months or the past two years).

In step 406, a search query is acquired. The search query may be acquired by a search and knowledge management system, such as the search and knowledge management system 220 in FIG. 2A. The search query may be acquired from a computing device, such as computing device 154 in FIG. 1. The search query may be entered on the computing device by a user and submitted to a search and knowledge management system by the user.

At query time, a search and knowledge management system may retrieve and score documents which match the search query both lexically and semantically. The search system may utilize a lexical document search system and a semantic document search system. The lexical document search system may identify exact matches of words or phrases from the search query within documents that have been indexed by a search system and the semantic document search system may utilize contextual meaning of that search query to generate relevant search results.

In step 408, a user identifier for the search query is identified. The search query may be inputted and submitted by a user of a computing device, such as computing device 154 in FIG. 1, using a search bar, such as the search bar 312 in FIG. 3A. The user identifier may correspond with a username for the user, such as the username 314 in FIG. 3A.

In step 410, a set of terms for the search query is determined. The set of terms may comprise a set of words or a set of tokens that derive from the search query. In one embodiment, the search query may be acquired as a string of characters and machine learning and/or natural language processing techniques may be used to determine the set of terms from the string of characters. In step 412, it is detected that the search query corresponds to a subject matter topic. The detection may include identifying one or more subject matter queries for the search query. In some cases, at query time, it is determined whether the search query refers to a subject matter topic that is visible to a user identified by the user identifier. In some embodiments, an automated subject matter classification may be performed on the search query via application of NLP techniques. In some embodiments, the search query may correspond to two or more different subject matter topics.

In step 414, a confidence level is assigned to the subject matter topic. In some cases, a search system may analyze the set of relevant documents to map words or phrases associated with the subject matter topic to particular users. The search system may use a pre-computed bank of "concepts" and/or "subject matter topics" from named entities and noun phrases mined from sentences across an organization's entire document corpus. If the subject matter topic matches a concept that appeared in two or more documents and was mentioned by two or more distinct users, then the search system may assign a high confidence level (e.g., above 0.9) to the subject matter topic. Else, if the subject matter topic matches a concept (but not in two or more documents from two or more users), then the search system may assign a medium confidence level (e.g., between 0.89 and 0.6) to the subject matter topic. Otherwise, the search system may assign a low confidence level (e.g., less than 0.2) to the subject matter topic.

In some cases, at query time, it is determined whether the search query is for a specific subject matter topic that is visible to the user. If the search query matches question patterns such as "who is an expert on < . . . >" or "who knows about < . . . >", the search system may strip away the question terms and only focus on "< . . . >" as the search query. If the search query includes any profanity, then the search system may not output a subject matter topic. If the search query lexically matches a person's name, a real-world location, or a department name within a company, then the search system may not output a subject matter topic. However, if none of the conditions that prevent the search system from outputting subject matter experts occur, then the search system may output the subject matter topic and subject matter experts for the subject matter topic.

In step 416, a set of relevant documents from the search index is identified using the set of terms and the user identifier. The set of relevant documents may comprise searchable documents within the search index with at least a threshold relevance score or at least a threshold number of matching terms from the set of terms (e.g., at least two terms within the set of terms are found in each of the set of relevant documents). The relevance score may be calculated for each indexed document within the search index using a number of factors or criteria, such as the presence of one or more terms from the set of terms within a title or summary of an indexed document, whether one or more terms from the set of terms have particular formatting within an indexed document (e.g., whether a term has been underlined or italicized), how recently an indexed document was updated and whether one or more terms of the set of terms were added within a particular period of time (e.g., a searched term was added within the past week), the term frequency or the number of times that one or more terms from the set of terms appears within an indexed document, the source rating for an indexed document (e.g., a word processing document or presentation slides may have a higher source rating than an electronic message), and a term proximity for the set of terms within an indexed document. The set of relevant documents may only comprise documents that may be accessed or viewed by a user identified by the user identifier.

In step 418, the set of relevant documents is ranked. The set of relevant documents may be ranked from a highest-scoring document of the set of relevant documents to the lowest-scoring document of the set of relevant documents. If the search query does not yield a minimum number of documents (e.g., at least 25 documents) visible to the user that match the set of terms, then the search system may not output a subject matter topic and may not output any suggested subject matter experts.

In some embodiments, an LLM may output a subject matter topic and a confidence level for the subject matter topic given the search query acquired in step 406.

In step 420, a set of users is determined. The set of users may correspond to all users of a search system or individuals within an organization. In step 422, a set of experts scores corresponding to the set of users for the subject matter topic is generated. Subject matter experts may be determined from the set of relevant documents using the set of experts scores. In one example, the subject matter experts may be identified as the top two highest ranking subject matter experts based on the set of expert scores. During scoring, user edits may be given a lower weight than authorship in the computation of an expertise score.

In one embodiment, the set of experts scores is determined using the set of relevant documents or a subset of the set of relevant documents. In one example, the set of experts scores is determined using the top 100 documents of the set of relevant documents. Each document of the set of relevant documents may include metadata identifying the users that created the document and/or made edits to the document.

In some cases, if it is detected that the search query corresponds to a valid subject matter topic, then the search system may score user relevance to the subject matter topic based on a weighted sum of the user's interaction type times the document scores computed during the ranking of the set of relevant documents in step 414. The search system may loop over a number of documents (e.g., the top 100 documents) of the set of relevant documents and compute a weighted user score in which authorship of a document adds a pre-determined weight * the score for the document computed during the ranking of the set of relevant documents. In some embodiments, this pre-determined weight can range from 0 to 2.0 and vary as described below. For documents that are tickets, both the creator and assignee of the ticket may be considered equal "authors" and both get the same pre-determined weight. If a user is not the author, then edits and comments on the document may add a smaller weight * the score for the document computed during the ranking of the set of relevant documents. For comments in a chat thread, 0 score may be added as those types of documents may not be deemed relevant.

In step 424, a set of expert users is identified using the set of expert scores. In one example, the top three scores from the set of expert scores may be used to identify the set of expert users. The set of expert users may be identified based on heuristics (e.g., prolificness of authorship and/or the prolificness in updating documents). In this case, the search system may require that a user has authored multiple distinct documents in the top 100 results to avoid counting users who may have just mentioned a subject matter topic once off-hand. In some cases, the number of subject matter experts identified in step 424 may depend on the confidence level assigned in step 418. The set of expert users may be identified if the confidence level for the subject matter topic assigned in step 418 is greater than a threshold confidence level (e.g., is greater than 0.8).

In step 426, an identification of the set of expert users is displayed based on the confidence level for the subject matter topic. In the final search ranking, the search system may return both document results (e.g., the most relevant documents for the search query) and expert results (e.g., the most relevant subject matter experts for the search query). The subject matter expert results may be dynamically interspersed or displayed based on the confidence level assigned in step 418.

In step 428, a subset of the set of relevant documents is displayed based on the ranking of the set of relevant documents. In one example, the subset of the set of relevant documents may comprise the first ten documents with the highest rankings. The subset of the set of relevant documents may be displayed using a display of a computing device, such as the computing device 154 in FIG. 1.

At least one embodiment of the disclosed technology includes acquiring a search query; identifying a user identifier for the search query; determining a set of terms for the search query; identifying a set of relevant documents from a search index of the system using the set of terms and the user identifier; ranking the set of relevant documents; detecting that the search query corresponds to a subject matter topic; generating a set of expert scores for the subject matter topic in response to detecting that the search query corresponds to the subject matter topic; identifying a set of expert users using the set of expert scores; displaying an identification of the set of expert users for the subject matter topic; and displaying at least a subset of the set of relevant documents based on the ranking of the set of relevant documents.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

The term "document" may refer to an electronic document that is machine-readable and machine-storable. A document may comprise, for example, an electronic file, a database file, an email, or a file with embedded links to other files. A document may include textual information, as well as embedded information such as metadata, images, and hyperlinks.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above in the Detailed Description can be combined to provide further embodiments. Aspects of the embodiments can be modified, if necessary to employ concepts of the various patents, applications and publications to provide yet further embodiments.

These and other changes can be made to the embodiments described above in the Detailed Description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a memory; and
a processing device, operatively coupled to the memory, the processing device configured to:
identify, based on a search query, a set of relevant documents from a search index of the system;
identify a subject matter topic associated with the relevant documents;
identify a set of users associated with contributions to the relevant documents;
generate, using a large language model (LLM), a set of expert scores for the set of users with respect to the subject matter topic based on a number of contributions and types of contributions each user of the set of users made to the subject matter topic of the relevant documents;
identify a set of expert users using the set of expert scores;
display an identification of the set of expert users for the subject matter topic and at least a subset of the set of relevant documents based on a ranking of the set of relevant documents.

2. The system of claim 1, wherein the processing device is further configured to:
assign a confidence level for the subject matter topic, the identifying the set of expert users includes identifying the set of expert users based on the confidence level for the subject matter topic.

3. The system of claim 1, wherein to generate the set of expert scores for the subject matter topic the processing device is configured to generate the set of expert scores based on user document interactions for the set of relevant documents.

4. The system of claim 1, wherein the processing device is further configured to:
identify the subject matter topic for the search query using a large language model.

5. The system of claim 1, wherein the processing device is further configured to:
identify a second subject matter topic different from the subject matter topic using the search query;
identify a second set of expert users for the second subject matter topic using the set of relevant documents; and
display a second identification of the second set of expert users for the second subject matter topic.

6. The system of claim 1, wherein the processing device is further configured to:
identify the set of expert users using a large language model.

7. The system of claim 1, wherein to generate the set of expert scores for the subject matter topic using the set of relevant documents the processing device is further configured to generate the set of expert scores based on content within the set of relevant documents and a document type for each document of the set of relevant documents.

8. The system of claim 1, wherein to generate the set of expert scores for the subject matter topic using the set of relevant documents model the processing device is configured to generate the set of expert scores based on user-document interactions with the set of relevant documents within a past threshold period of time.

9. The system of claim 8, wherein to generate the set of expert scores for the subject matter topic using the set of relevant documents the processing device is configured to weight user authorship more than user edits for the set of relevant documents.

10. The system of claim 8, wherein to identify the set of expert users the processing device is configured to identify the set of expert users using the set of relevant documents that the user identifier has permissions to access.

11. The system of claim 1, wherein to identify the set of expert users the processing device is configured to determine a number of expert users for the set of expert users based on a confidence level for the subject matter topic.

12. A method, comprising:
identifying, based on a search query, a set of relevant documents from a search index using the search query;
identifying a subject matter topic associated with the relevant documents;
identifying a set of users associated with contributions to the relevant documents;
generating, using a large language model (LLM), a set of expert scores for the set of users with respect to the subject matter topic based on a number of contributions and types of contributions each user of the set of users made to the subject matter topic of the relevant documents;
identifying a set of expert users using the set of expert scores;
displaying an identification of the set of expert users for the subject matter topic and at least a subset of the set of relevant documents based on a ranking of the set of relevant documents.

13. The method of claim 12, further comprising:

determining a confidence level for the subject matter topic and identifying the set of expert users based on the confidence level.

14. The method of claim 13, wherein: the identifying the set of expert users comprises determining a number of expert users for the set of expert users based on the confidence level.

15. The method of claim 12, wherein: generating the set of expert scores for the subject matter topic is performed using one or more large language models.

16. The method of claim 15, wherein: generating the set of expert scores for the subject matter topic comprises generating the set of expert scores based on user document interactions for the set of relevant documents.

17. The method of claim 15, further comprising:

identifying a second subject matter topic different from the subject matter topic using the search query;

identifying a second set of expert users for the second subject matter topic using the set of relevant documents; and displaying a second identification of the second set of expert users for the second subject matter topic.

18. The method of claim 17, wherein: displaying the second identification of the second set of expert users for the second subject matter topic comprises displaying email addresses for each of the second set of expert users.

19. A non-transitory computer readable storage medium having instructions stored thereon that, when executed by a processing device, cause the processing device to:

identify, based on a search query, a set of relevant documents from a search index of the system;

identify a subject matter topic associated with the relevant documents;

identify a set of users associated with contributions to the relevant documents;

generate, using a large language model (LLM), a set of expert scores for the set of users with respect to the subject matter topic based on a number of contributions and types of contributions each user of the set of users made to the subject matter topic of the relevant documents;

identify a set of expert users using the set of expert scores;

display an identification of the set of expert users for the subject matter topic and at least a subset of the set of relevant documents based on a ranking of the set of relevant documents.

* * * * *